United States Patent [19]

Welte et al.

[11] Patent Number: 5,070,115

[45] Date of Patent: Dec. 3, 1991

[54] SUBSTANTIALLY CLOSED-CELL RIGID FOAMS CONTAINING URETHANE, UREA AND BIURET GROUPS AND A PROCESS FOR THEIR PRODUCTION

[75] Inventors: Rainer Welte, Leverkusen; Hans-Joachim Scholl, Colonge, both of Fed. Rep. of Germany

[73] Assignee: Bayer Aktiengesellschaft, Leverkusen, Fed. Rep. of Germany

[21] Appl. No.: 663,221

[22] Filed: Mar. 1, 1991

[30] Foreign Application Priority Data

Mar. 8, 1990 [DE] Fed. Rep. of Germany ....... 4007330

[51] Int. Cl.$^5$ .............................................. C08G 18/14
[52] U.S. Cl. ..................................... 521/173; 521/174
[58] Field of Search ................................ 521/173, 174

[56] References Cited

U.S. PATENT DOCUMENTS 4,897,431  1/1990  Scherzer et al. ................... 521/172

FOREIGN PATENT DOCUMENTS 1592534  7/1981  United Kingdom .

Primary Examiner—Maurice J. Welsh
Attorney, Agent, or Firm—Joseph C. Gil; Lyndanne M. Whalen

[57] ABSTRACT

Rigid substantially closed cell foams are made by reacting an organic isocyanate with a mixture of high molecular weight polyols in the presence of water, a catalyst and other optional materials such as chain extenders, crosslinking agents and flameproofing agents. The reactants are used in quantities such that the isocyanate to hydroxyl group index is from about 90 to about 150. The mixture of high molecular weight polyols is composed of (1) a polyester having at least two hydroxyl groups and an OH number greater than 150 and/or a polyether having at least two hydroxyl groups and an OH number greater than 200 and (2) a polyether having at least two hydroxyl groups and an OH number below 100. The foams produced in accordance with this process are useful as insulating materials and as structural reinforcing materials.

11 Claims, No Drawings

SUBSTANTIALLY CLOSED-CELL RIGID FOAMS CONTAINING URETHANE, UREA AND BIURET GROUPS AND A PROCESS FOR THEIR PRODUCTION

BACKGROUND OF THE INVENTION

This invention relates to substantially closed-cell rigid foams containing urethane, urea and biuret groups which are suitable for use as insulating materials and/or for reinforcing mechanical structural components and to a process for the production of these foams.

Processes for the production of substantially closed-cell rigid foams containing urethane, urea and biuret groups are generally known.

A summary of processes for the production of rigid foams can be found, for example, in Kunststoff-Handbuch, Vol. VII, "Polyurethane", edited by R. Vieweg and A. Höchtlen, pages 504 et seq (Carl-Hanser-Verlag, München 1966.)

Rigid substantially closed cell foams are normally produced by reaction of aromatic polyisocyanates with a relatively high molecular weight polyol, preferably a polyether or a polyester polyol, in the presence of a blowing agent, a catalyst, a flameproofing agent and other auxiliaries and additives. Mixtures of polyether or polyester polyols have also been used instead of individual polyether or polyester polyols. Such mixtures have been used to reduce costs. More specifically, mixing expensive polyester polyols suitable for the production of high-quality rigid polyurethane (PU) foams with inexpensive polyether polyols reduces the overall cost of polyol used to produce the foam. Suitable low-viscosity polyester polyols for the production of rigid PU foams having favorable mechanical properties are described, for example, in German Offenlegungsschrift 27 04 196.

The esters used may also be recycled products of relatively high molecular weight esters. In this case, too, the esters may also be used as relatively inexpensive components for reducing the cost of the mixtures. These inexpensive esters are obtained, for example, by glycolysis of high molecular weight dimethyl terephthalate (DMT) polymers or by processing of the distillation residues remaining behind in the production of DMT.

Use of polyester polyols as the relatively high molecular weight polyhydroxyl compound for the production of rigid foams containing urethane groups, may improve the flame resistance and reduce the brittleness of the product foam. However, such polyester polyols show unsatisfactory miscibility with the halogenated hydrocarbons typically used as blowing agents due to their relatively high polarity by comparison with polyether polyols such as polyoxypropylene polyols.

German Offenlegungsschrift 36 42 666 teaches that this miscibility problem is obviated by using polyester polyols having lateral alkyl groups.

Each of the above-mentioned processes employs chlorofluorocarbon (CFC) blowing agents to obtain desirable rigid foam characteristics, such as for example toughness, adhesion to surface layers and reduced flammability.

Rigid foams produced in accordance with known processes without CFC blowing agents show significant disadvantages, namely: brittleness, flammability and non-adhesion to surface layers, as to be seen from the comparison example 3.

SUMMARY OF THE INVENTION

It is an object of the present invention to provide a new process for the production of rigid foams having good toughness and adhesion properties and reduced flammability, wich avoids the use of CFC blowing agents.

It is also an object of the present invention to provide a process for producing rigid foams in which nevertheless traditional formulation ingredients were employed.

It is a further object of the present invention to provide rigid foams suitable for use as an insulation material and/or as a reinforcing material for mechanical structural components.

These and other objects which will be apparent to those skilled in the art are accomplished by reacting an organic isocyanate with a polyol mixture, water, a catalyst and usual additives. The polyol mixture employed includes (1) a polyester containing at least two hydroxyl groups and having an OH number greater than 150 and/or a polyether having at least two hydroxyl groups and an OH number greater than 200 and (2) an ethylene oxide-containing polyether having at least two hydroxyl groups and an OH number below 100 at an NCO to OH index of from about 90 to about 150.

DETAILED DESCRIPTION OF THE INVENTION

The present invention relates to a process for the production of substantially closed-cell rigid foams containing urethane, urea and biuret groups and to the foams produced by this process. In the process of the present invention, an organic polyisocyanate is reacted with relatively high molecular weight polyols in the presence of a catalyst and water as the blowing agent. Additives which may optionally be included in the reaction mixture include chain-extending and/or cross-linking agents and other known auxiliaries and/or additives. The relatively high molecular weight polyols used are mixtures of (1) polyesters containing at least two hydroxyl groups and having an OH value above 150 and/or polyethers containing at least two hydroxyl groups and having an OH value above 200 and (2) ethylene-oxide-containing polyethers bearing at least two hydroxyl groups and having an OH value below 100. The foam forming reaction is carried out at an isocyanate index of from about 90 to about 150, preferably from about 100 to about 130.

In the preferred embodiments of the invention, polyesters having an OH number greater than about 200 and/or polyethers having an OH number greater than 300 are used as the polyol component (1); polyethers containing ethylene oxide with an OH number of from about 25 to about 56 having an ethylene oxide content of from about 10 to about 30% by weight (based on total alkylene oxide) are used as the polyol component (2); the quantitative ratios between the polyol components (1) and (2) are 90:10 to 10:90 and preferably 70:30 to 30:70% by weight; the reaction is carried out at an isocyanate index of from about 90 to about 150 and preferably from about 100 to about 130; and the substantially closed-cell rigid foams containing urethane, urea and biuret groups have densities of from about 20 to about 200 kg/m$^3$.

The rigid foams produced in accordance with the present invention are useful as insulating materials and/or for reinforcing mechanical structural components.

The isocyanates useful in the practice of the present invention include aliphatic, cycloaliphatic, araliphatic, aromatic and heterocyclic polyisocyanates of the type described for example by W. Siefken in Justus Liebigs Annalen der Chemie, 362, pages 75 to 136. For example, suitable isocyanates include those corresponding to the formula $$Q(NCO)_n$$

in which
n represents 2 - 5, preferably 2 - 3, and
Q represents an aliphatic hydrocarbon radical containing from 2 to 18 carbon atoms, preferably from 6 to 10 carbon atoms; a cycloaliphatic hydrocarbon radical containing from 4 to 15, preferably from 5 to 10 carbon atoms; an aromatic hydrocarbon radical containing from 6 to 15 carbon atoms, preferably from 6 to 13 carbon atoms. Specific examples of polyisocyanates are described in German Offenlegungsschrift 28 32 253, pages 10-11.

In general, it is preferred to use commercially readily available polyisocyanates such as 2,4- and 2,6-tolylene diisocyanate and mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"). Modified polyisocyanates derived from 2,4-and/or 2,6-tolylene diisocyanate or from 4,4'- and/or L 2,4'-diphenyl methane diisocyanate are particularly preferred. The relatively high molecular weight organic compounds containing at least two hydroxyl groups used in the process of the present invention are mixtures of polyols in which one component is selected from polyesters having an OH number above 150, preferably from about 200 to about 250 and/or polyethers having an OH number above 200, preferably from about 300 to about 400 and the second component is selected from polyethers containing ethylene oxide with an OH number below 100, preferably from about 25 to about 56 and preferably with an ethylene oxide content of from about 10 to about 30% by weight. The quantitative ratios of the first component of the polyol mixture to the second component of the polyol mixture are generally from 90:10 to 10:90, preferably from 70:30 to 30:70% by weight.

Other starting components which may optionally be included in the reaction mixture include compounds containing at least two isocyanate-reactive hydrogen atoms and having a molecular weight of from 32 to 399. These compounds which may contain hydroxyl groups and/or amino groups and/or thiol groups and/or carboxyl groups, preferably hydroxyl groups and/or amino groups serve as chain extenders or crosslinkers. These compounds generally contain from 2 to 8, preferably 2 to 4 isocyanatereactive hydrogen atoms. Specific examples of these chain extenders or crosslinkers are given in German Offenlegungsschrift 28 32 253 at pages 19-20.

Water is used as the blowing agent in the process of the present invention. Catalysts useful in the process of the present invention are known. Specific examples of suitable catalysts are given in Kunststoff-Handbuch Polyurethane, Volume VII, pages 521. Dimethyl cyclohexylamine is a particularly preferred catalyst.

The mixture of high molecular weight polyols, water and optional chain extenders and crosslinkers are used in quantities such that the NCO:OH index is between 90 and 150, preferably between 100 and 130.

Auxiliaries and additives which may optionally be used in the process of the present invention include: surface-active additives, such as emulsifiers and foam stabilizers; known reaction retarders and cell regulators such as paraffins or fatty alcohols or dimethyl polysiloxanes; pigments or dyes; known flameproofing agents such as tris-chloroethyl phosphate, tricresyl phosphate; also stabilizers against the effects of ageing and weather; plasticizers; fungistatic and bacteriostatic substances; and fillers such as barium sulfate, kieselguhr, carbon black or whiting. Specific examples of these optional auxiliaries and additives are described, for example, in German Offenlegungsschrift 27 32 292 at pages 21-24. Additional examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and information on the way in which these additives are used and on their respective modes of action can be found in Kunststoff Handbuch by Vieweg and Hochtlen, Vol. VII, Carl-Hanser-Verlag, Munchen 1966, for example on pages 103 to 113.

The substantially closed-cell rigid foams containing urethane, urea and biuret groups of the present invention may be produced by any of the methods known to those skilled in the art using commercially available equipment.

Having thus described our invention, the following examples are given as being illustrative thereof. All parts and percentages given in the following examples are parts by weight and percentages by weight, unless otherwise indicated.

EXAMPLES

The following components were used to produced the foams described in Table 1:

Flexible foam polyether 1

Polyether, OH number 28, propylene glycol as starter, containing 87% PO and (terminally) 13% EO.

Flexible foam polyether 2

Polypropylene oxide ether, OH number 56, propylene glycol as starter.

Rigid foam polyester

Polyester of adipic acid/phthalic acid (molar ratio 1:0.5) and glycerol/propylene glycol; OH number 213.

Rigid foam polyether 1

Polypropylene oxide ether, OH number 530,

| starter: ethylenglykol | 61% OH |
|---|---|
| sugar | 38% OH |
| water | 1% OH |

Rigid foam polyether 2

Polyether, OH number 617, trimethylol propane as starter, containing 33% by weight PO and 67% by weight EO, viscosity 1150 mPa.s/25° C.

Silicone stabilizer

Polyether siloxane B 8421, a product of Goldschmidt, Essen.

Catalyst

Dimethyl cyclohexylamine

Isocyanate 1

Crude MDI, viscosity at 20° C.: 200 mPa.s

Isocyanate 2

Isocyanate prepolymer of crude MDI (viscosity at 20C=200 mPa.s) and a polyester of adipic acid/phthalic acid and diethylene glycol, OH value 530. Isocyanate content of the prepolymer=27% by weight, viscosity at 24° C.=1,000 mPa.s.

EXAMPLES
Foams are produced in known manner using the following formulations:

|  |  | Example 1 | Example 2 (Comp.) | Example 3 (Comp.) | Example 4 | Example 5 (Comp.) |
|---|---|---|---|---|---|---|
| Flexible foam polyether 1 | (g) | 30 | — | — | 40 | — |
| Flexible foam polyether 2 | (g) | — | 30 | — | — | 30 |
| Rigid foam polyester | (g) | — | — | — | 20 | 20 |
| Rigid foam polyether 1 | (g) | 70 | 70 | 100 | — | — |
| Rigid foam polyether 2 | (g) | — | — | — | 40 | 50 |
| Water | (g) | 4.00 | 4.00 | 4.00 | 4.20 | 4.00 |
| Silicone stabilizer | (g) | 2.50 | 2.50 | 2.70 | 3.00 | 3.00 |
| Catalyst | (g) | 0.45 | 0.45 | 0.45 | 0.30 | 0.30 |
| Isocyanate 1 | (g) | 139 | 141 | 170 | — | — |
| Isocyanate 2 | (g) | — | — | — | 160 | 172 |
| Reaction times: |  |  |  |  |  |  |
| Stirring time | (s) | 10 | 10 | 10 | 10 | 10 |
| Cream time | (s) | 24 | 29 | 28 | 29 | 32 |
| Gel time | (s) | 179 | 187 | 170 | 136 | 140 |
| Density | (kg/m³) | 33.2 | 32.8 | 32.2 | 41.7 | 44.1 |
| Adhesion to sheet metal |  | good | average | none | good | average |
| Foam characteristic on sheet metal |  | tough | tough/soft | brittle | tough | tough/soft |

Example 1 shows that a foam produced in accordance with the present invention, even when it is blown solely by water, showed good adhesion to sheet metal and a tough foam characteristic.

Example 2 shows that the use of non-hydrophilic flexible foam polyethers resulted in poorer adhesion and in a softer foam structure.

Example 3 shows that adequate adhesion was not achieved where only typical rigid foam polyethers were used.

Example 4 demonstrates the use of rigid foam polyesters in a formulation within the scope of the present invention. Adhesion to sheet metal was excellent.

Example 5 shows that satisfactory adhesion could not be achieved where non-hydrophilic flexible foam polyethers were used.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of substantially closed-cell rigid foams containing urethane, urea or biuret groups comprising reacting
   a) an organic polyisocyanate with
   b) a mixture of high molecular weight polyols which includes
      b1) a polyester containing at least two hydroxyl groups and having an OH number greater than 150 or
      b2) a polyether having at least two hydroxyl groups and an OH number greater than 200 or
      b3) a mixture of b1) and b2) and
      b4) an ethylene oxide containing polyether having at least two hydroxyl groups and an OH number below 100 in the presence of
   c) water and
   d) a catalyst at an isocyanate to hydroxyl group index of from about 90 to about 150.

2. The process of claim 1 in which polyol b1) has an OH number greater than 200.

3. The process of claim 1 in which polyol b2) has an OH number greater than 300.

4. The process of claim 1 in which polyol b3) is a mixture of polyol b1) which has an OH number greater than 200 and of polyol b2) which has an OH number greater than 300.

5. The process of claim 1 in which polyol b4) is a polyether having an ethylene oxide content of from about 10 to about 30% by weight, based on total alkylene oxide, and an OH number of from about 25 to about 56.

6. The process of claim 1 in which the ratio of polyol components b1), b2) and b3) to b4) is from about 90:10 to about 10:90% by weight.

7. The process of claim 1 in which the ratio of polyol components b1), b2, and b3) to b4) is from about 70:30 to about 30:70% by weight.

8. The process of claim 1 in which the isocyanate to hydroxyl group index is from about 100 to about 130.

9. A process for the production of a substantially closed cell rigid foam containing urethane, urea or biuret groups comprising reacting
   a) an organic polyisocyanate with
   b) a mixture of high molecular weight polyols containing 1) a polyester having at least two hydroxyl groups and an OH number of greater than 200,
2) a polyether having at least two hydroxyl groups and an OH number of greater than 300, and
3) an ethylene oxide containing polyether having at least two hydroxyl groups in which the ethylene oxide content is from about 10 to about 30% by weight of the total alkylene oxide content and an OH number of from about 25 to about 56 with
c) water and
d) a catalyst in quantities such that the ratio of the sum of b1) and b2) to b3) is from about 90:10 to about 10:90% by weight, and the ratio of isocyanate to total hydroxyl groups is from about 100 to about 130.

10. A rigid substantially closed-cell foam containing urethane, urea or biuret groups and having a density of from about 20 to about 200 kg/m$^3$ produced by the process of claim 1 which is suitable for insulation and structural reinforcement applications.

11. A rigid substantially closed-cell foam containing urethane, urea or biuret groups and having a density of from about 20 to about 200 kg/m$^3$ produced by the process of claim 9 which is suitable for insulation and structural reinforcement applications.

* * * * *